(12) United States Patent
Lonnes

(10) Patent No.: US 7,467,778 B2
(45) Date of Patent: Dec. 23, 2008

(54) SLURRY TOLERANT PILOT OPERATED RELIEF VALVE

(75) Inventor: Steven B. Lonnes, Pearland, TX (US)

(73) Assignee: ExxonMobil Upstream Research Company, Houston, TX (US)

( * ) Notice: Subject to any disclaimer, the term of this patent is extended or adjusted under 35 U.S.C. 154(b) by 0 days.

(21) Appl. No.: 10/569,560

(22) PCT Filed: Sep. 14, 2004

(86) PCT No.: PCT/US2004/029831

§ 371 (c)(1), (2), (4) Date: Feb. 27, 2006

(87) PCT Pub. No.: WO2005/028934

PCT Pub. Date: Mar. 31, 2005

(65) Prior Publication Data

US 2007/0001134 A1  Jan. 4, 2007

Related U.S. Application Data

(60) Provisional application No. 60/503,042, filed on Sep. 15, 2003.

(51) Int. Cl.
F16K 31/00 (2006.01)
(52) U.S. Cl. .......... 251/63.5; 251/62
(58) Field of Classification Search .......... 251/62, 251/63.5, 63.6
See application file for complete search history.

(56) References Cited

U.S. PATENT DOCUMENTS

| | | | |
|---|---|---|---|
| 2,199,549 A | 5/1940 | Saunders | 137/139 |
| 3,593,959 A * | 7/1971 | Greene | 251/63.6 |
| 3,799,269 A | 3/1974 | Brown et al. | 166/315 |
| 3,913,883 A | 10/1975 | Irwin | 251/25 |
| 4,036,297 A | 7/1977 | Swihart, Sr. | 166/250 |
| 4,294,284 A | 10/1981 | Herd | 137/613 |
| 4,316,482 A * | 2/1982 | Pearce et al. | 137/315.07 |
| 4,335,744 A * | 6/1982 | Bey | 137/522 |
| 4,421,182 A | 12/1983 | Moody et al. | 175/65 |
| 4,515,344 A * | 5/1985 | Gemignani | 251/63.5 |
| 4,576,235 A | 3/1986 | Slaughter et al. | 166/374 |
| 4,744,386 A | 5/1988 | Frazer | 137/315 |
| 4,807,846 A * | 2/1989 | Greiner et al. | 251/129.15 |
| 4,819,746 A | 4/1989 | Brown et al. | 175/296 |
| 4,828,219 A | 5/1989 | Ohmi et al. | 251/118 |
| 5,108,069 A | 4/1992 | Tada et al. | 251/58 |
| 5,253,706 A | 10/1993 | Reid | 166/135 |
| 5,419,361 A * | 5/1995 | Caudle et al. | 137/316 |
| 5,445,224 A | 8/1995 | Comeaux | 166/312 |
| 5,634,627 A * | 6/1997 | Daido et al. | 251/335.3 |
| 5,676,342 A * | 10/1997 | Otto et al. | 251/38 |
| 5,924,443 A * | 7/1999 | Wohlfahrt | 137/505 |
| 6,273,195 B1 | 8/2001 | Hauck et al. | 166/374 |
| 6,349,772 B2 | 2/2002 | Mullen et al. | 166/187 |
| 7,044,434 B2 * | 5/2006 | Brinks et al. | 251/122 |

FOREIGN PATENT DOCUMENTS

| | | |
|---|---|---|
| EP | 0060549 | 9/1982 |
| WO | WO 2003/025338 | 3/2003 |

OTHER PUBLICATIONS

EP Search Report #RS 110659 dated Apr. 23, 2004, 2 pgs.
PCT International Search Report & Written Opinion dated Jan. 13, 2005, 5 pgs.

* cited by examiner

Primary Examiner—John K Fristoe, Jr.

(57) ABSTRACT

Cartridge-style fluid control devices are provided that are static pressure independent and capable of repeatable, reliable, particulate insensitive performance in service conditions typical of downhole intervention environments.

9 Claims, 1 Drawing Sheet

SLURRY TOLERANT PILOT OPERATED RELIEF VALVE

This application is the National Stage of International Application No. PCT/US04/029831, filed 14 Sep. 2004, which claims the benefit of U.S. Provisional Patent Application No. 60/503,042, filed 15 Sep. 2003.

FIELD OF THE INVENTION

This invention pertains to fluid control devices for metering, maintaining, and isolating fluid pressure and flow between two or more sources.

BACKGROUND OF THE INVENTION

Fluid control is routinely practiced within a wide variety of industries. Control is typically achieved using devices that are specifically designed to perform a unique control operation. Examples of such control devices are pressure relief valves, pressure regulators, back-pressure regulators, velocity fuses, mass flow controllers, pilot operated valves, check valves, and shuttle valves.

Pressure is typically communicated from one source to another via the flow of gas or liquid. Operational challenges arise when the flow used to communicate pressure is laden with particulates. These particulates introduce the potential for a device to lose functionality as a result of solids becoming lodged in a device's moving parts, as well as damage resulting from the cutting capacity of high velocity, particle-laden fluid streams passing over a device's sealing components. The use of rigid seal materials such as metal or thermoplastics enhance the durability of a device, but compromise the sealability of the device.

For example, a steel ball could never seal a circular steel aperture if a sand grain was wedged between the steel ball and the edge of the aperture (or if the edge of the aperture was slightly nicked). If the ball was made of a pliable material such as rubber, the ball could seal the circular aperture because the sand grain could imbed in the ball and the ball could then fully contact the perimeter of aperture. While the rubber ball is a superior sealing material, it is also highly susceptible to damage from the cutting action of high velocity fluid streams.

Many valving designs directly, or indirectly, involve three pressures: 1.) inline high pressure source; 2.) inline low pressure source; and 3.) a static pressure source, e.g., ambient pressure in a spring cavity. Valve designs that involve an isolated, or sealed, static pressure exhibit limited functionality in a downhole environment. The primary reason is that most downhole operations are performed in a well that is filled with liquid, thus the static pressure increases as a function of depth. This change in static pressure results in a change in valve performance as a function of depth. Valve designs that provide free static pressure communication to all actuating parts within the system enable depth (or static pressure) independence. This is because fluid based valve actuation forces result from differential pressures acting upon an area. Since the actuation forces are based on the difference between pressure sources, the reference pressure (or static pressure) that is common to all sources is canceled out, and the performance of the valve becomes depth independent.

An additional criteria required of downhole fluid control operations is related to size. Wellbores of various diameters are created in an effort to optimize the economic impact of a field development; and valves must be smaller than the wellbore diameter in which they are deployed. As a result, valves with small external dimensions possess a larger portfolio of accessible intervention wells than larger valves of similar function. In addition, when valves are deployed downhole they are not readily accessible for servicing; thus significant expense is typically incurred if valve failures occur during an intervention program. This emphasizes the need for downhole valves to be highly reliable.

For various applications, certain advantages can be realized by designing a control valve device in the form of a cartridge valve. A cartridge style control valve offers the following benefits: 1.) the ability to interchangeably deploy the same valve in multiple tools that require the given valve's control function; 2.) the ability to incorporate the valve into cartridge valve based logic systems; 3.) the ability to verify functionality before deployment by performing bench-top surface testing of the valve; 4.) simplified valve replacement and servicing; and 5.) cartridge valves are well suited for deployment in parallel, or series (e.g., for the purpose of redundancy in safety critical applications).

Most downhole fluid control devices are deployed as a single unit or connected in series with other downhole components. The systems are generally comprised of a combination of annular based components, springs, and/or balls. Annular based components are defined as parts that are symmetric about the centerline of the valve. The valves tend to have rigid seal materials and are designed in a fashion that are susceptible to compromised functionality due to particulate bridging between the rigid seal materials. Current technology does not provide a suitable physical design, or design concept for the problem.

A need exists for small cartridge-style fluid control devices that are static pressure independent and capable of repeatable, reliable, particulate insensitive performance in service conditions typical of downhole intervention environments. An object of this invention is to provide such fluid control devices. Other objects will become apparent through consideration of the following specification together with the accompanying drawings.

SUMMARY OF THE INVENTION

In one embodiment, the present invention is a pressure-actuated valve comprising: (a) a valve body with a cavity formed therein, said cavity being defined by a retaining cap at one end of the valve body and extending from there for a length until an annular wall is encountered, said annular wall separating the cavity for the remainder thereof into a central bore and an outer annular region, said valve body having two passages from outside the valve body into the bore serving interchangeably for inlet and outlet of fluids (possibly containing small solids) whose flow is to be controlled by the valve, and an annular valve seat disposed in said bore between said inlet and said outlet, said inlet and outlet being disposed in the bore remote from the retaining cap, said retaining cap having a passage through it providing communication between outside the valve body and the valve body cavity; (b) a plunger with a head and a sealing end, said plunger being movably disposed within said bore with said head end extending out of the bore into the valve body cavity, said head being larger than the outer diameter of said annular wall enclosing said bore, said sealing end being adapted for operative engagement with said valve seat thus preventing fluid flow between the inlet and the outlet and constituting the off position for the valve, said plunger having a range of travel in the bore to a valve-open position at which the plunger head contacts the retaining cap, said plunger's length being determined such that fluid passage between the inlet and the outlet is substantially unobstructed by the plunger in the valve-open position; (c) a spring disposed in said outer annular region surrounding said bore such that the plunger head contacts the spring requiring compression of the spring in order for the plunger's sealing end to contact the valve seat wherein, in operation, a high-pressure actuating fluid entering the valve body cavity through the passage in the retaining cap exerts pressure on the plunger head tending to force the plunger toward the valve seat and closing the valve when the fluid pressure overcomes the spring's resistance; and (d) a seal between the plunger and the bore disposed between (i) the fluid inlet and outlet and (ii) the end of the bore nearer to the retaining cap, said seal isolating the high-pressure actuating fluid from the fluid flowing between said valve body inlet and outlet.

In some embodiments of the present invention, the valve further comprises a bushing movably disposed between the spring and the plunger head, with inner diameter large enough to fit movably around the annular wall defining the central bore. The bushing can serve as a shim adjustment for the valve's operation, thereby determining the thickness of the bushing. In some embodiments of the invention, the valve body is formed for cartridge-style deployment. In some embodiments of the invention, the spring is installed under compression, i.e., it is in a state of partial compression even when the plunger head is fully up against the retaining cap.

DESCRIPTION OF THE DRAWINGS

The advantages of the present invention will be better understood by referring to the following detailed description and the attached drawings in which.

Figure 1A:
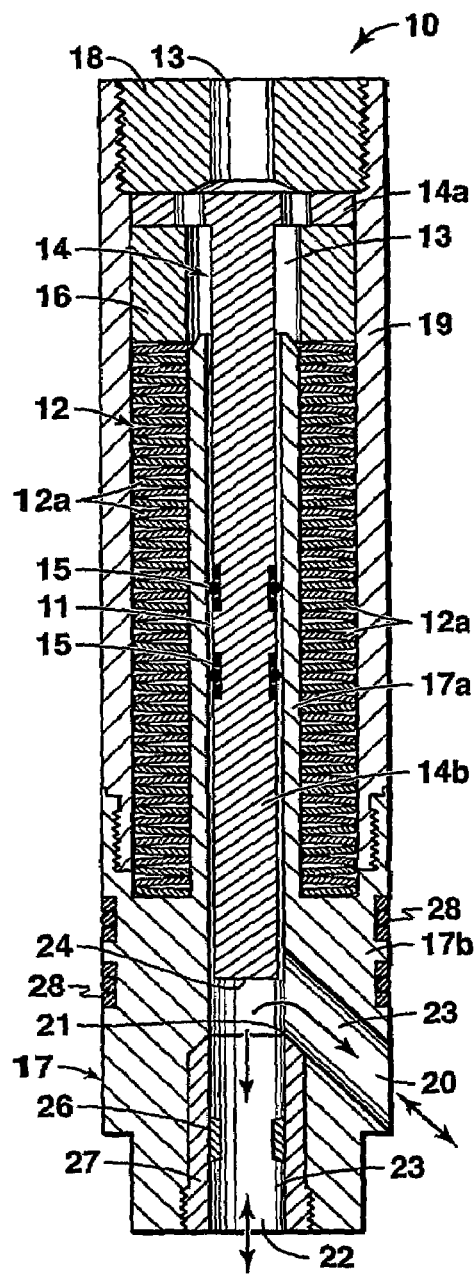
FIG. 1A illustrates a valve according to this invention in the open position.

While the invention will be described in connection with its preferred embodiments, it will be understood that the invention is not limited thereto. To the extent that the following description is specific to a particular embodiment or a particular use of the invention, this is intended to be illustrative only, and is not to be construed as limiting the scope of the invention. On the contrary, the invention is intended to cover all alternatives, modifications, and equivalents which may be included within the spirit and scope of the present disclosure, as defined by the appended claims.

DETAILED DESCRIPTION OF THE INVENTION

The following discussion describes the invention within the context of oilfield downhole intervention technology, although the invention is not limited to such use.

An application in which a valve according to this invention is particularly useful is fracture stimulation, especially when used with a coiled tubing deployed intervention tool that comprises an inflatable packer, slips, and a circuit of cartridge valves that perform tasks as a function of applied pressure. In wellbores with multiple zones open (multiple sets of reservoir intervals in communication with the wellbore at different depths), the possibility exists that flow will exit one reservoir interval and travel through the wellbore into another reservoir interval. This phenomenon is called cross-flow and it is driven by a pressure imbalance between reservoirs. If a bottom hole assembly (i.e., BHA or intervention tool) is located between two zones that are cross-flowing, the potential exists for the BHA to be pushed uphole and buckle the coiled tubing, pulled downhole and pull apart the BHA or coiled tubing, or damage the BHA as debris passes by the tool at high rates.

This phenomenon can be particularly significant while an inflatable packer is being inflated and deflated. This is because during the inflation and deflation process the packer reaches a point where the packer has effectively shut-off the cross-flow fluid passing between the casing and the packer but has not yet contacted the casing with enough force to anchor it in place. At this time, the differential pressure that exists between the cross-flowing reservoir intervals is applied to the full cross-sectional area of the un-anchored BHA. Depending on the specific application, the resulting forces could be significant and promote the aforementioned results. In an effort to avoid the potential results of operating an inflatable packer in the presence of cross-flow, the pressure across the packer is preferably equalized through the center of the packer until it is firmly anchored to the wall.

To achieve this goal, a pilot operated relief valve according to this invention is incorporated into the BHA design. The valve equalizes wellbore pressure across the inflatable packer while it is inflating and then closes the equalization path after the packer has fully contacted the casing walls. During packer deflation the valve opens prior to release of the packer from the casing wall and remains open during the deflation process. The valve is designed to be pressure actuated using a pilot pressure from the coiled tubing. The use of coiled tubing pressure to control the valve's operation enables the valve to actuate at the proper time relative to the packer inflation and deflation cycle.

An application in which the intervention tool is particularly useful is reservoir fracture stimulation using sand or proppant. Thus, the fluid environment in which the valve is expected to operate reliably is one in which sand and proppant may pass through the valve under normal operating conditions or under upset operating conditions. Since wellbore fluids are typically laden with various particles, the valve design must be robust with respect to actuation and sealing in the presence of particulate debris.

The general function of a Pilot Operated Relief Valve (PORV) according to this invention is described below. The valve is designed to remain fully open when the actuating pressure remains below a pre-set value. When the actuating pressure surpasses this pre-set pressure, the closing process is initiated. When the valve is closed, the fluid pressure acting on the valve plunger does not have an effective area to act upon, thus the valve's function is independent of this pressure. This feature is particularly important if the intervention application involves applying significant pressure to the fluid in this passage (e.g., fracture stimulation operations). Operation of the valve is described in connection with a packer, as described above. The packer is not shown in the drawings.

Referring to the drawings, the primary moving parts of a valve 10 according to this invention are: (i) spring assembly 12 that preferably comprises a plurality of springs or discs 12a; (ii) a plunger 14 having a head 14a and a sealing end 14b; and (iii) bushing 16. A valve 10 according to this invention also comprises valve body 17 having a hollow spring support portion 17a and a connector portion 17b, valve body sleeve 19, seat 26, seat housing 27, and retaining cap 18. A fluid pressure force acts at cross-sectional area 11 to move plunger 14 toward seat 26; i.e., high pressure fluid 13 above cross-sectional area 11 acts on cross-sectional area 11 to push plunger 14 in the direction of seat 26. Plunger 14 moves axially and its motion is governed by a force balance between the force of springs 12 pushing plunger 14 away from seat 26 and the fluid pressure force acting at cross-sectional area 11 pushing plunger 14 toward seat 26.

When valve 10 is in the open position, the force of springs 12 is greater than the pressure force at cross-sectional area 11 and it pushes plunger 14 away from seat 26 and holds it against retaining cap 18. Flow is free to communicate in either direction between passage 20, for fluid from uphole of the packer, and passage 22, for fluid from downhole of the packer. High pressure actuating fluid 13 is isolated from fluid 23 flowing between passages 20 and 22 by seals 15 in plunger 14 at cross-sectional area 11 and seals 28 on valve body 17.

As the pressure of actuating fluid 13 is increased above the pre-set close value of valve 10, the pressure force at cross-sectional area 11 overcomes the force of springs 12 (plus any breakaway friction force from seals or O-rings 15 in plunger 14 at cross-sectional area 11) and begins to push plunger 14 toward seat 26. As plunger 14 moves toward seat 26, flow begins to be restricted through the region between the bottom of plunger 14 and location 21. As bottom edge 24 of plunger 14 reaches location 21, flow is significantly reduced. This reduction in flow, in combination with the vertical and inclined passage geometry leading up to location 21, allows particles to tumble away from location 21 before plunger 14 enters the orifice of passage 22. This reduction in flow rate results in a reduction in particle delivery rate and particle delivery size to the pinch point at location 21, thus the likelihood of particles becoming lodged between plunger 14 and location 21 is diminished. In addition, the curved geometry of the sharp location 21 edge insures that only a small number of particles could reside at the pinch point. The large plunger force attainable via the actuating fluid pressure acting on cross-sectional area 11 provides sufficient force to shear through a small number of particulate grains.

Figure 1B:
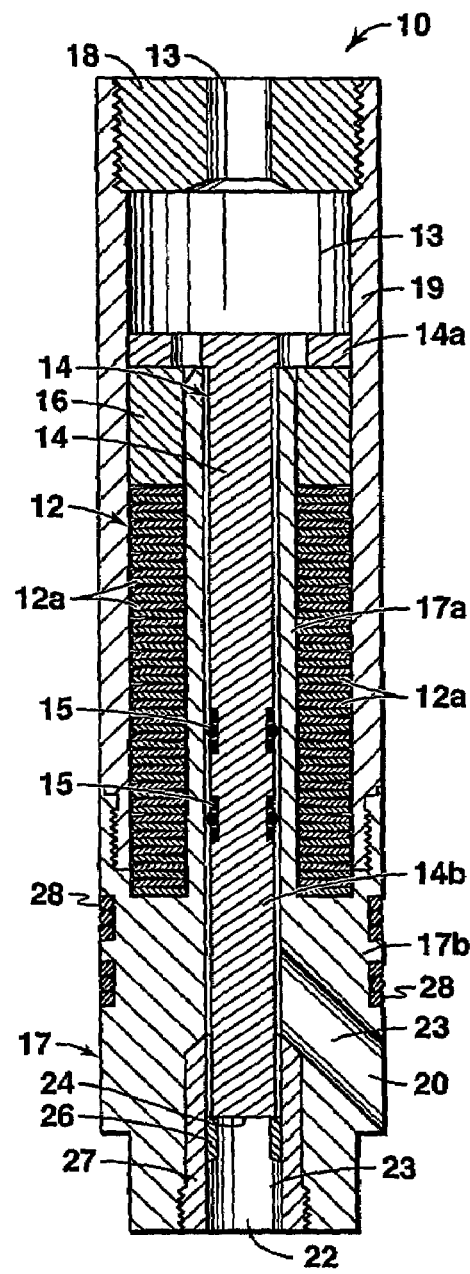
FIG. 1B illustrates a valve according to this invention in the closed position.

Referring now to FIG. 1B, as plunger 14 continues its downward stoke it enters the orifice of passage 22. The diameter tolerance between plunger 14 and the orifice is preferably small in an effort to significantly reduce the flow rate through valve 10 (e.g., about 0.13 mm to 0.25 mm, (0.005 in to 0.010 in)). If the flow direction is from passage 22 to passage 20, the significantly reduced flow rate limits the size of particles that can be carried against gravity to seat 26 of passage 22. If the flow direction is from passage 20 to passage 22, then the gap between plunger 14 and the orifice of passage 22 acts as a screen that filters all particles greater than the gap width. As a result, regardless of the flow direction between passages 20 and 22, there is a physical mechanism that acts to minimize the size and delivery rate of particles to seat 26. Seat 26 is preferably designed with a 45° chamfer to allow particles to fall from seat 26 under the influence of gravity, or to be squeezed off during the seating process.

In addition, seat 26 is preferably designed with a relatively small diameter decrease from the diameter of passage 22. The size of the small lip that comprises the plunger contact portion of seat 26 (e.g., about 0.25 mm (0.010 in)) provides an upper bound on the particle diameter that could fit on the lip, assuming that it was possible for the particle to maintain a stable position on the 45° chamfer. In addition, the low-profile nature of seat 26 provides minimal restriction to flow when valve 10 is fully open.

Valve 10 is re-opened by reducing the actuating pressure and allowing the spring force to push plunger 14 back to retaining cap 18. The pressure at which valve 10 becomes fully open is nominally similar to the pre-set pressure that initiated the valve closing process. After valve 10 is opened, fluid is able to freely exchange between passages 20 and 22.

EXAMPLES

The following discussion provides a paper example that is based on deployment of a pilot operated relief valve (PORV) according to this invention in a fracture stimulation application. For this example a coiled tubing deployed bottom-hole-assembly (BHA) is assumed and this BHA is comprised of an inflatable packer and a circuit of cartridge valves that perform tasks as a function of applied pressure. It is also assumed that packer inflation occurs via applied coiled tubing pressure, and the PORV port for actuation fluid (fluid 13 in the drawings) is in communication with the coiled tubing. Additionally, it is assumed that an independent flow passage exists through the center of the packer with one passage in the PORV (passage 20 in the drawings) in communication with the annular fluid uphole of the packer and another passage (passage 22 in the drawings) being in communication with the fluid downhole of the packer. It is also assumed that the fracture stimulation is pumped between the casing and the coiled tubing into an interval uphole of the inflated packer. It is also assumed that the fracture stimulation process occurs in a wellbore with several pre-existing reservoir intervals in communication with the wellbore below the location of the BHA.

It is assumed that the PORV is configured to remain open up to an actuating pressure of 13.8 MPa (2000 psi) and with a close pressure of 34.5 MPa (5000 psi). With the BHA positioned between reservoir intervals that are in communication with the wellbore, the possibility exists that the two intervals are in cross-flow communication. The application of pressure to the coiled tubing initiates the packer inflation process. As the inflatable packer increases in diameter and begins to touch the casing wall, the fraction of the cross-flow that was originally passing between the outside diameter of the packer and the inside diameter of the casing diverts into the equalization passage running through the center of the packer. Increasing the coiled tubing pressure to approximately 13.8 MPa (2000 psi) anchors the packer to casing walls and initiates the closing process for the pilot operated relief valve. As the coiled tubing pressure is increased the PORV begins to close, the packer anchoring pressure increases, and the cross-flow induced differential pressure begins to build across the packer. Increasing the coiled tubing pressure to 34.5 MPa (5000 psi) closes the PORV and places 34.5 MPa (5000 psi) of anchoring pressure into the packer.

The stimulation program is initiated after the packer is firmly anchored to the casing wall. Since the packer is sealed against the casing walls and the PORV is closed, all stimulation fluids pumped down the annulus between the casing and coiled tubing are injected into the desired reservoir interval. Since passage 20 (see the drawings) of the PORV is in direct communication with the fluid above the packer, the stimulation pressures applied to the annulus are directly applied to the plunger in the PORV via passage 20. However, since the PORV is designed such that there is essentially no effective area for this stimulation pressure to act, the valve remains closed.

Following the stimulation, the coiled tubing pressure is decreased. When the coiled tubing pressure and packer pressure reach approximately 13.8 MPa (2000 psi) the PORV has completely re-opened and pressure equalization is fully enabled. Decreasing the coiled tubing pressure to zero allows the packer to release from the casing walls and deflate. The stimulation is then complete and the BHA is free to move uphole.

Although this invention is well suited for use in oilfield downhole intervention technology, it is not limited thereto; rather, this invention is suitable for any application where fluid control is required. Additionally, while the present invention has been described in terms of one or more preferred embodiments, it is to be understood that other modifications may be made without departing from the scope of the invention, which is set forth in the claims below.

I claim:

1. A pressure-actuated valve comprising:

(a) a valve body with a cavity formed therein, said cavity being defined by a retaining cap at one end of the valve body and extending from there for a length until an annular wall is encountered, said annular wall separating the cavity for the remainder thereof into a central bore and an outer annular region, said valve body having two passages from outside the valve body into the bore serving interchangeably for inlet and outlet of fluids (possibly containing small solids) whose flow is to be controlled by the valve, and an annular valve seat disposed in said bore between said inlet and said outlet, said inlet and outlet being disposed in the bore remote from the retaining cap, said retaining cap having a passage through it providing communication between outside the valve body and the valve body cavity;

(b) a plunger with a head and a sealing end, said plunger being movably disposed within said bore with said head end extending out of the bore into the valve body cavity, said head being larger than the outer diameter of said annular wall enclosing said bore, said sealing end being adapted for operative engagement with said valve seat thus preventing fluid flow between the inlet and the outlet and constituting the off position for the valve, said plunger having a range of travel in the bore to a valve-open position at which the plunger head contacts the retaining cap, said plunger's length being determined such that fluid passage between the inlet and the outlet is substantially unobstructed by the plunger in the valve-open position;

(c) a spring disposed in said outer annular region surrounding said bore such that the plunger head contacts the spring requiring compression of the spring in order for the plunger's sealing end to contact the valve seat wherein, in operation, a high-pressure actuating fluid entering the valve body cavity through the passage in the retaining cap exerts pressure on the plunger head tending to force the plunger toward the valve seat and closing the valve when the fluid pressure overcomes the spring's resistance; and (d) a seal between the plunger and the bore disposed between (i) the fluid inlet and outlet and (ii) the end of the bore nearer to the retaining cap, said seal isolating the high-pressure actuating fluid from the fluid flowing between said valve body inlet and outlet;

wherein one of said two passages into the bore for valve-controlled fluids is disposed such that it enters the bore non-axially into the side of the bore at a location between the valve seat and the plunger head, thereby enabling no more than negligible fluid pressure on the plunger in a direction tending to force the valve open from a closed position; and wherein the non-axial passage has a vertical and inclined passage geometry leading up to an intersection where the non-axial passage intersects the bore, wherein the vertical and inclined passage geometry is adapted to resist particle accumulation in the non-axial passage, and wherein the intersection between the non-axial passage and the bore is configured to resist particle settling at the intersection.

2. The valve of claim 1, further comprising a bushing movably disposed between said spring and said plunger head, said bushing serving as a shim adjustment to the valve operation, thereby determining the bushing's thickness.

3. The valve of claim 1, wherein the other passage into the bore for valve-controlled fluids is a continuation of said bore through the valve body at the end of the valve body remote from the retaining cap.

4. The valve of claim 1 wherein the clearance tolerance between the plunger and the bore is between 0.13 mm and 0.25 mm.

5. The valve of claim 1 where the valve seat is designed with a chamfer of approximately 45 degrees.

6. The valve of claim 1, wherein said annular valve seat has a radial dimension of approximately 0.25 mm.

7. The valve of claim 1, wherein said valve body is formed for cartridge-style deployment.

8. The valve of claim 1, wherein said spring is designed to be in a state of partial compression with said plunger head in contact with said retaining cap.

9. The valve of claim 1, wherein said spring comprises a plurality of stacked Belleville (disc) springs.

* * * * *